United States Patent [19]
Yamada

[11] Patent Number: 6,066,926
[45] Date of Patent: *May 23, 2000

[54] ELECTRONIC FLASH DEVICE AND POWER SUPPLY CIRCUIT

[75] Inventor: Masanori Yamada, Sagamihara, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/948,469

[22] Filed: Oct. 10, 1997

[30] Foreign Application Priority Data

Oct. 17, 1996 [JP] Japan ................................. 8-294666
Sep. 24, 1997 [JP] Japan ................................. 9-258336

[51] Int. Cl.$^7$ ................................................ H05B 41/14
[52] U.S. Cl. .............................. 315/241 P; 315/241 S; 396/206; 363/15
[58] Field of Search .......................... 315/241 P, 241 S, 315/241 R; 396/159, 205, 206; 363/20, 15

[56] References Cited

U.S. PATENT DOCUMENTS 4,522,479  6/1985  Yamada et al. ..................... 315/241 P

*Primary Examiner*—Michael B Shingleton
*Attorney, Agent, or Firm*—Robin, Blecker & Daley

[57] ABSTRACT

An electronic flash device in which a voltage of a power supply battery is boosted to be supplied to a load, includes a first oscillation portion of self-excited type, a second oscillation portion of separately-excited type, and a changeover portion which performs a changeover between causing the first oscillation portion to operate and causing the second oscillation portion to operate, according to a condition of the load.

27 Claims, 7 Drawing Sheets

ELECTRONIC FLASH DEVICE AND POWER SUPPLY CIRCUIT

BACKGROUND OF THE INVENTION

1. Field of the Invention

The present invention relates to an electronic flash device having a boosting circuit and to a power supply circuit.

2. Description of Related Art

In a boosting circuit which charges a capacitor through a secondary winding of a boosting transformer by turning on and off a transistor connected to a primary winding of the boosting transformer by self-excited oscillation, the oscillation frequency becomes high in general when the voltage of the capacitor becomes higher, i.e., when a charging current to the capacitor from the secondary winding becomes smaller.

In such a condition, a current flowing at the primary winding of the transformer immediately before turning-off of the transistor inevitably arises in order for the transistor to shift to its off-state. However, the current flowing at the primary winding at that time does not contribute to a charging action on the capacitor and becomes useless energy. In the conventional boosting circuit, such useless energy is repeatedly generated at the above-stated high frequency of oscillation, thereby causing the great loss of energy.

The details of the conventional boosting circuit are as described below with reference to FIGS. 5, 6 and 7.

In FIG. 5, reference numeral 1 denotes a power supply battery, numeral 2 denotes a power supply switch. One end of the power supply switch 2 is connected to the plus terminal of the power supply battery 1 and the other end is connected to the emitter of a PNP transistor 5. A resistance 3 and a capacitor 4 each are connected between the base and the emitter of the PNP transistor 5. The PNP transistor 5 has its emitter connected to the plus terminal of the power supply battery 1, its collector connected to one end of a primary winding of a boosting transformer 7 and its base connected to one end of a feedback winding of the boosting transformer 7.

The primary winding of the boosting transformer 7 has its one end connected to the collector of the transistor 5 and the other end connected to the minus terminal of the power supply battery 1. The feedback winding of the boosting transformer 7 has its one end connected to the base of the transistor 5 and the other end connected to a resistance 6. The secondary winding of the boosting transformer 7 has its one end connected to the anode of a rectifying diode 8 and the other end connected to the base of the transistor 5. The rectifying diode 8 has its cathode connected to the anode of a main capacitor 9. The main capacitor 9 is arranged to supply a flashing energy to a xenon discharge tube 17. The main capacitor 9 has its anode connected to the cathode of the diode 8 and its cathode connected to the minus terminal of the power supply battery 1.

A resistance 10 has its one end connected to a flashing signal transmission circuit 18 and the other end connected to the gate of an SCR (silicon controlled rectifier) 14. A resistance 11 and a capacitor 12 are connected in parallel. The parallel circuit thus obtained is connected between the gate and the cathode of the SCR 14. A resistance 13 has its one end connected to the anode of the main capacitor 9 and the other end connected to the anode of the SCR 14.

A capacitor 15 for triggering has its one end connected to the anode of the SCR 14 and the other end connected to one end of the primary winding of a trigger transformer 16. The SCR 14 has its gate connected to one end of the resistance 10, its anode connected to one end of the capacitor 15 and its cathode connected to the cathode of the main capacitor 9. The trigger transformer 16 has a primary winding and a secondary winding. The primary winding of the trigger transformer 16 has its one end connected to one end of the capacitor 15 and the other end connected to the cathode of the SCR 14. The secondary winding of the trigger transformer 16 has its one end connected to the trigger electrode of the xenon discharge tube 17 and the other end connected to the cathode of the SCR 14.

The xenon discharge tube 17 is arranged to make a flash emission, and has its anode connected to the anode of the main capacitor 9 and its cathode connected to the cathode of the main capacitor 9. The flashing signal transmission circuit 18 is arranged to generate a high-level signal upon receipt of a flashing start signal from a camera (not shown).

The resistances 10, 11 and 13, the capacitors 12 and 15, the SCR 14, the trigger transformer 16, the xenon discharge tube 17 and the flashing signal transmission circuit 18 shown in FIG. 5 jointly constitute a known xenon tube flashing circuit. In this circuit, the xenon discharge tube 17 emits a flash light in response to the flashing start signal. However, the details of the operation of the xenon tube flashing circuit are omitted herein.

A voltage boosting action on the main capacitor 9 shown in FIG. 5 is next described as follows. When the power supply switch 2 is turned on, a base current of the transistor 5 which serves as a switching element flows through the feedback winding of the boosting transformer 7 and the resistance 6, and a collector current of the transistor 5 flows to the primary winding of the boosting transformer 7. Then, an oscillation circuit which is composed of the resistances 3 and 6, the capacitor 4, the transistor 5 and the boosting transformer 7 begins to perform self-excited oscillation.

Operation of the boosting circuit to be performed when the voltage of the main capacitor 9 is at a low level is next described with reference to FIG. 7. Referring to FIG. 7, when the base current of the transistor 5 flows at a point of time t4, an increase of the feedback current is fed back to the primary winding of the boosting transformer 7. As a result, the current flowing to the primary winding of the transformer 7, i.e., the collector current of the transistor 5, increases. The increase of the current flowing to the primary winding of the transformer 7 is fed back to the feedback winding thereof to increase the base current of the transistor 5, so that the transistor 5 is completely turned on.

With the transistor 5 turned on, a charging current flows to the main capacitor 9 through the diode 8 which is connected to the secondary winding of the boosting transformer 7. At this time, the collector current of the transistor 5 becomes a very large current between a point of time t4 and another point of time t5 as shown in FIG. 7. This is because the voltage of the main capacitor 9 is at a low level. Thus, the charging current flowing to the main capacitor 9 when the voltage of the main capacitor 9 is low is much larger than a charging current flowing to the main capacitor 9 when the voltage of the main capacitor 9 is high.

A current which is irrelevant to the supply of current to the secondary winding of the transformer 7 gradually increases accordingly as time elapses from the point of time t4. Then, this current causes the magnetic flux density of a magnetic substance of the transformer 7 to increase also gradually. When this current reaches a level Ip shown in FIG. 7, the magnetic flux density of the magnetic substance reaches its saturation area, so that the feedback action becomes no longer performed, with the result that the transistor 5 shifts to its off-state.

When the transistor 5 is in its on-state, the collector current of the transistor 5 is much larger than the current Ip, i.e., several to scores of times as much as the current Ip. Further, the transistor 5 shifts to its off-state at the point of time t5. The period between the points of time t4 and t5 is caused to vary by the voltage of the main capacitor 9, and is longer accordingly as the voltage of the main capacitor 9 is lower. When the transistor 5 is turned off at the point of time t5, energy stored in the boosting transformer 7 causes the output of the feedback winding to oscillate. With the output of the feedback winding oscillating, a reverse bias is applied for a predetermined period of time to the base of the transistor 5 and, after that, a forward bias is applied to cause a base current of the transistor 5 to flow. Then, the action from the point of time t4 is repeated, and the oscillation is caused to continue.

Generally, in the boosting transformer 7, a current which is irrelevant to the supply of current to the secondary winding is much smaller than the collector current of the transistor 5. Therefore, the loss of that current is very small and hence inconsequential.

Operation of the boosting circuit to be performed when the voltage of the main capacitor 9 is high is next described with reference to FIG. 6. When a base current of the transistor 5 begins to flow at a point of time t1 due to self-excited oscillation, the transistor 5 is turned on, as mentioned above with reference to FIG. 7. After that, the main capacitor 9 is charged through the secondary winding of the transformer 7 and the diode 8. However, since the voltage of the main capacitor 9 is high in this instance, the charging current is small and, therefore, the collector current of the transistor 5 is also small.

However, as mentioned above, a current which is irrelevant to the supply of current to the secondary winding of the boosting transformer 7 gradually increases. This current causes the magnetic flux density of the magnetic substance of the transformer 7 to gradually increase. Then, the magnetic flux density begins to become saturated at a point of time t2. Then, the collector current of the transistor 5, i.e., the current flowing to the primary winding of the boosting transformer 7, rapidly increases. When this current reaches a level Ip shown in FIG. 6, the magnetic flux density of the magnetic substance reaches its saturation area, so that the feedback action becomes no longer performed, with the result that the transistor 5 shifts to its off-state. The current Ip is larger than the current obtained between the points of time t1 and t2. Further, a period between the points of time t2 and t3 is a value which is not inconsequential as compared with the period between the points of time t1 and t2. The large loss of current thus takes place during the period between the points of time t2 and t3.

In the conventional boosting circuit described above, the switching transistor 5 on the side of the primary winding of the transformer 7 is turned on when the base current of the transistor 5 is caused to begin to flow at the point of time t1 shown in FIG. 6 by the self-excited oscillation. The main capacitor 9 is then charged through the secondary winding of the transformer 7. Since the voltage of the main capacitor 9 is high in this instance, the charging current is small and, therefore, the collector current of the transistor 5 is also small.

However, as mentioned above, the amount of a current which is irrelevant to the supply of current to the secondary winding of the transformer 7 gradually increases. This current causes the magnetic flux density of the magnetic substance of the transformer 7 to gradually increase. The magnetic flux density begins to become saturated from the point of time t2. Then, the collector current of the transistor 5, i.e., the current flowing to the primary winding of the transformer 7, rapidly increases. When the collector current of the transistor 5 reaches the level Ip, as shown in FIG. 6, to bring the magnetic flux density of the magnetic substance of the transformer 7 to its saturation area, the feedback action ceases to be performed, and the transistor 5 shifts to its off-state. The current Ip is larger than the current obtained between the points of time t1 and t2. Further, the period between the points of time t2 and t3 is a value which is not inconsequential as compared with the period between the points of time t1 and t2. The large loss of current thus takes place during the period between the points of time t2 and t3.

Further, in the conventional boosting circuit, when the voltage of the power supply battery is low (i.e., when the load is large), an oscillating action of the self-excited oscillation circuit is inhibited. Accordingly, when the voltage of the power supply battery becomes lower, the oscillating action is made to be performed intermittently, thereby causing the oscillation transformer to generate an uncomfortable oscillation sound.

BRIEF SUMMARY OF THE INVENTION

In accordance with one aspect of the invention, there is provided an electronic flash device, or a power supply circuit, in which a voltage of a power supply battery is boosted to be supplied to a load, comprising a first oscillation portion of self-excited type, a second oscillation portion of separately-excited type, and a changeover portion which performs a changeover between causing the first oscillation portion to operate and causing the second oscillation portion to operate, according to a condition of the load, so that an apposite operation can be effected according to the condition of the load.

The above and other aspects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

Figure 1:
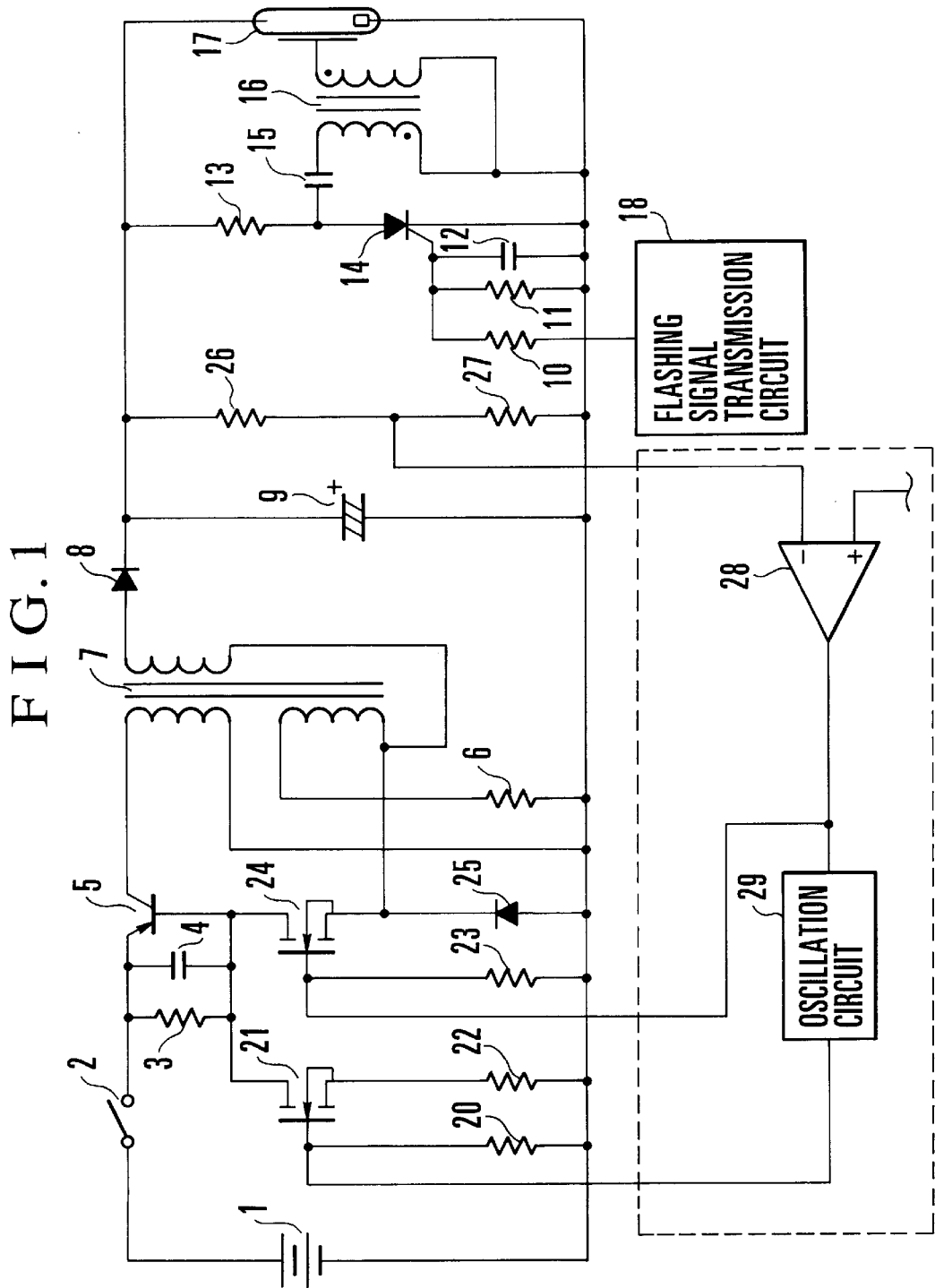
FIG. 1 is a circuit diagram showing the arrangement of a first embodiment of the invention.
Figure 5:
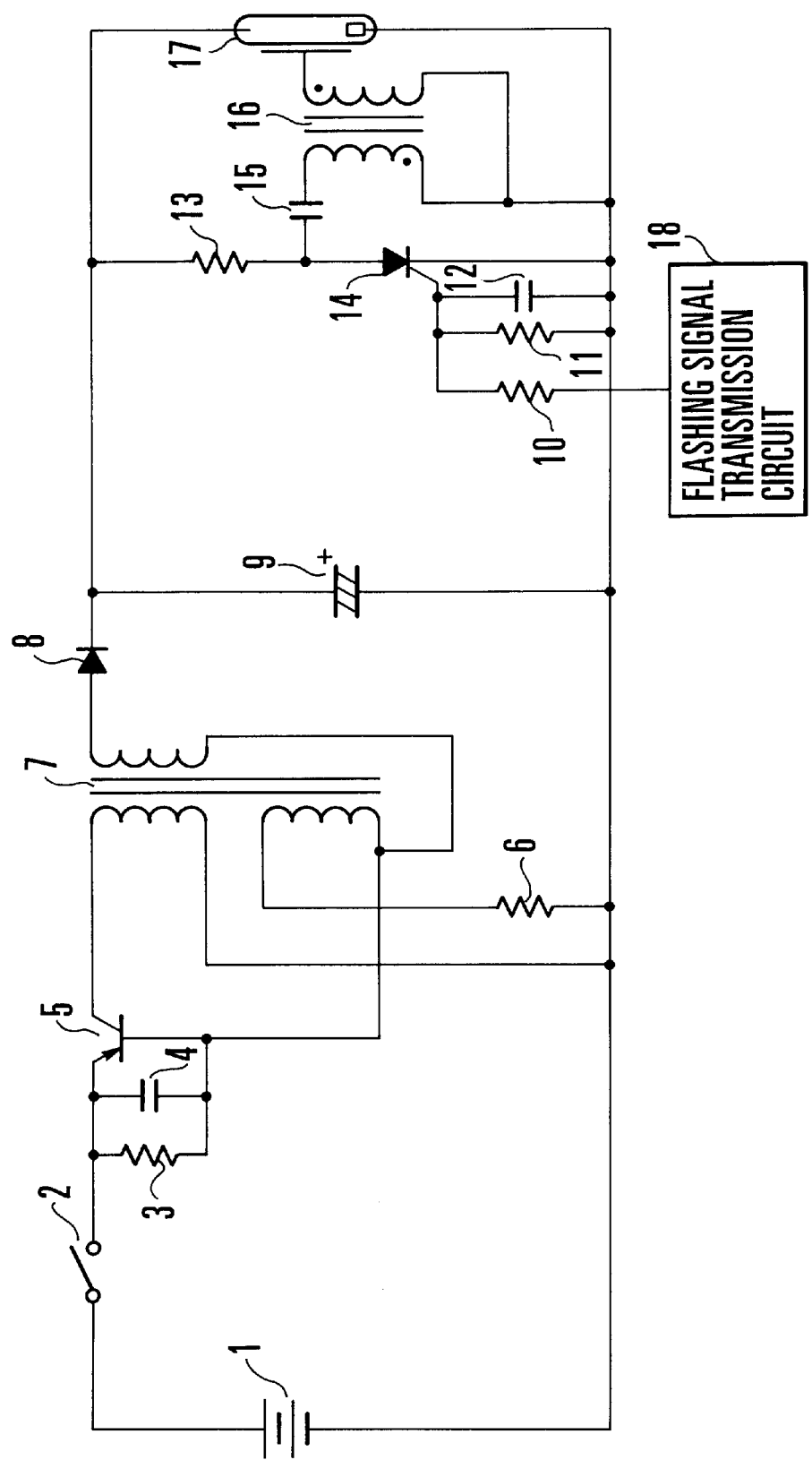
FIG. 5 is a circuit diagram showing by way of example the arrangement of the conventional device.

FIG. 1 is a circuit diagram showing the arrangement of a first embodiment of the invention. In FIG. 1, all elements that have the same functions as those of the conventional device shown in FIG. 5 are indicated by the same reference numerals as those used in FIG. 5, and the details of them are omitted from the following description.

A resistance 20 has its one end connected to the gate of an FET (field-effect transistor) 21 and the other end connected to the minus terminal of the power supply battery 1. The FET 21 serves as a switching element and has its gate connected to the output of an oscillation circuit 29, its source connected to one end of a resistance 22 and its drain connected to the base of the transistor 5. The resistance 22 has its one end connected to the source of the FET 21 and the other end connected to the minus terminal of the power supply battery 1. A resistance 23 has its one end connected to the gate of another FET 24 and the other end connected to the minus terminal of the power supply battery 1.

The FET 24 serves as a switching element and has its gate connected to the output of a comparator 28, its source connected to one end of the feedback winding of the boosting transformer 7 and its drain connected to the base of the transistor 5. A diode 25 has its anode connected to the minus terminal of the power supply battery 1 and its cathode connected to the source of the FET 24.

Resistances 26 and 27 are connected in series to each other to constitute a series circuit, which is connected in parallel to the main capacitor 9. The comparator 28 has its minus input terminal connected to a junction point between the resistances 26 and 27, its plus input terminal connected to a reference voltage source (not shown) and its output terminal connected to the gate of the FET 24.

The oscillation circuit 29 is arranged to turn on for a predetermined period of time and, after that, to turn off for another predetermined period of time. The turning-on and turning-off of the oscillation circuit 29 are repeated in a predetermined cycle. The oscillation circuit 29 has its input terminal connected to the output of the comparator 28 and its output terminal connected to the gate of the FET 21. Upon receiving a high-level signal at the input terminal, the oscillation circuit 29 is inhibited from oscillating and has its output at a low level, and upon receiving a low-level signal at the input terminal, the oscillation circuit 29 begins to oscillate. The comparator 28 and the oscillation circuit 29 are supplied with electric power from the power supply battery 1.

Figure 7:
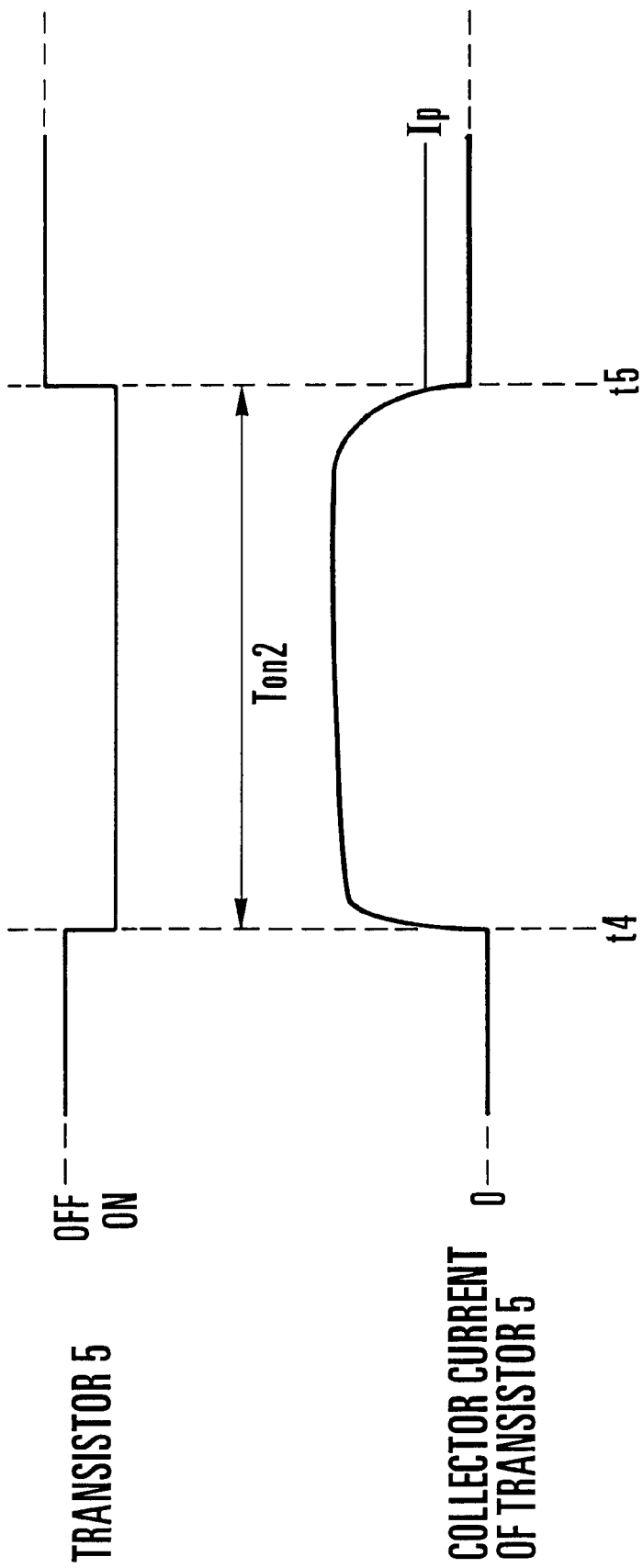
FIG. 7 is a time chart showing an operation of the conventional device shown in FIG. 5.

Next, operation of the first embodiment shown in FIG. 1 is described as follows. When the power supply switch 2 is turned on, a voltage at the minus input of the comparator 28 is lower than the reference voltage, since the main capacitor 9 has not yet been charged. Therefore, the output of the comparator 28 is at a high level, and with the input of the oscillation circuit 29 at a high level, the oscillating action of the oscillation circuit 29 is inhibited. Accordingly, the FET 21 is in an off-state. Further, since the high-level signal from the comparator 28 is applied to the gate of the FET 24, the FET 24 is in an on-state. Under this condition, a self-excited oscillation takes place in the same manner as the boosting action to be performed when the voltage of the main capacitor 9 is low in the conventional device described in the foregoing with reference to FIG. 7.

With the main capacitor 9 charged by the self-excited oscillation, the output of the comparator 28 shifts to a low level when the voltage of the main capacitor 9 reaches a predetermined value which is defined by the resistance value of the resistances 26 and 27 and the voltage of the reference voltage source connected to the pulse input terminal of the comparator 28. The final charge voltage of the main capacitor 9 is set at 330 V, and a voltage of the main capacitor 9 which causes the output of the comparator 28 to shift to a low level is set at value in the range of 100 V to 200 V. When the level of the output of the comparator 28 becomes low, the FET 24 is turned off and the oscillation circuit 29 begins to oscillate to cause a boosting action by a separately-excited oscillation to begin.

Figure 2:
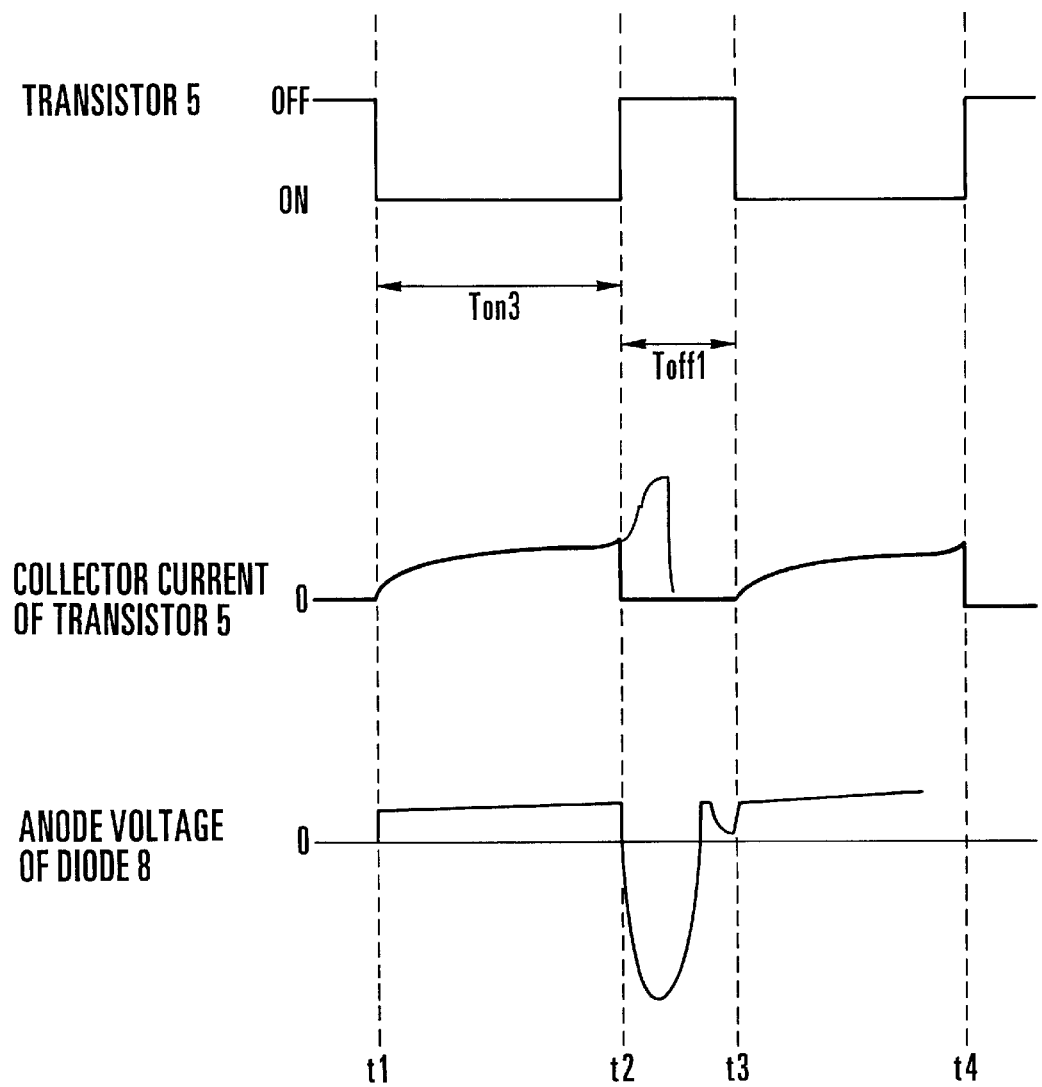
FIG. 2 is a time chart showing an operation of the first embodiment shown in FIG. 1.

The operation of the oscillation circuit 29 and the boosting action on the main capacitor 9 are described with reference to FIG. 2 as follows. Referring to FIG. 2, the oscillating action of the oscillation circuit 29 causes a high-level voltage to be outputted during a period from a point of time t1 to a point of time t2 and a low-level voltage to be outputted during a period from the point of time t2 to a point of time t3, in a repeating manner. The FET 21 is turned on by the high-level voltage at the point of time t1. Then, the base current of the transistor 5 flows through the FET 21 and the resistance 22, so that the transistor 5 is turned on. The transistor 5 remains in its on-state until the point of time t2, to charge the main capacitor 9 through the secondary winding of the boosting transformer 7, the diode 8 and the diode 25.

Figure 6:
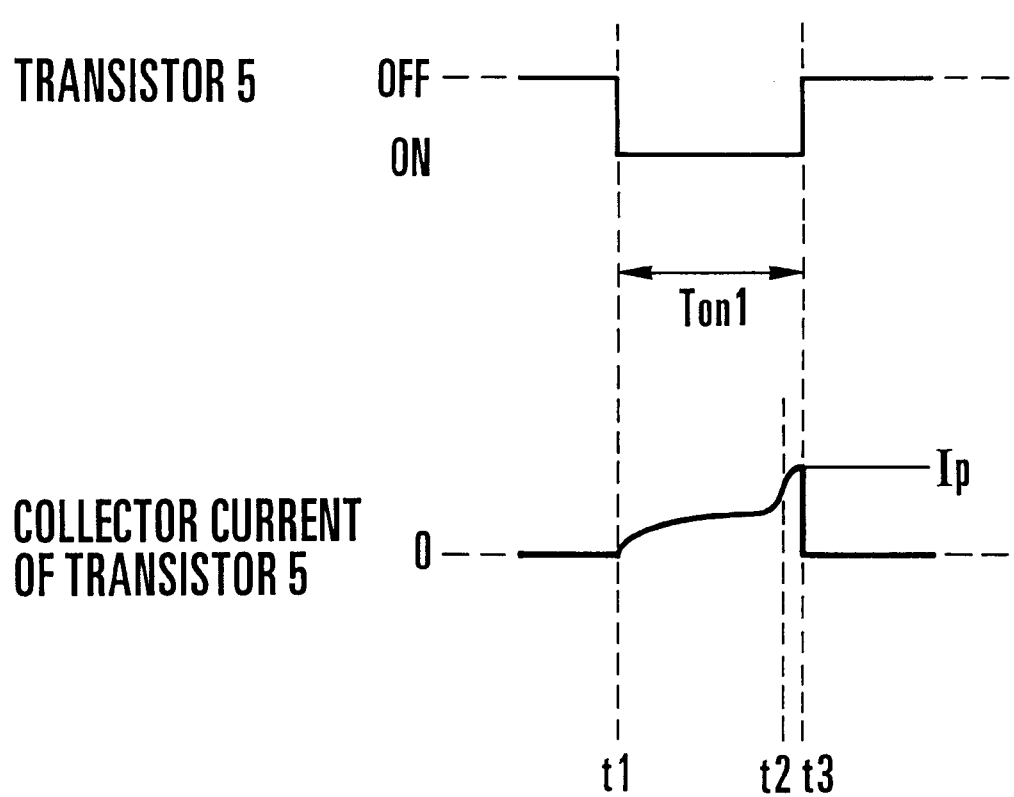
FIG. 6 is a time chart showing an operation of the conventional device shown in FIG. 5.

The collector current of the transistor 5, i.e., a current flowing to the primary winding of the boosting transformer 7, obtained at this time is shown in FIG. 2. The FET 21 is turned off at the point of time t2 and remains off until the point of time t3. This process is repeated to charge the main capacitor 9. Herein, a period Ton3 between the points of time t1 and t2 is set to be shorter than a period Ton1 between the points of time t1 and t2 shown in FIG. 6. Accordingly, the loss of current taking place between the points of time t2 and t3 shown in FIG. 6 can be effectively prevented.

The operation in a period Toff1 between the points of time t2 and t3 shown in FIG. 2 during which the transistor 5 is in its off-state is next described. As indicated by the waveform of the anode voltage of the diode 8 in FIG. 2, the oscillation circuit 29 is arranged such that, when the transistor 5 is turned off at the point of time t2, the energy stored in the boosting transformer 7 causes the anode voltage of the diode 8 to first shift to a negative voltage and then to become a positive voltage again to temporarily charge the main capacitor 9 before the transistor 5 is turned on. If the off-state period Toff1 is too short, an energy loss taking place when the transistor 5 is turned on would be large.

Figure 3:
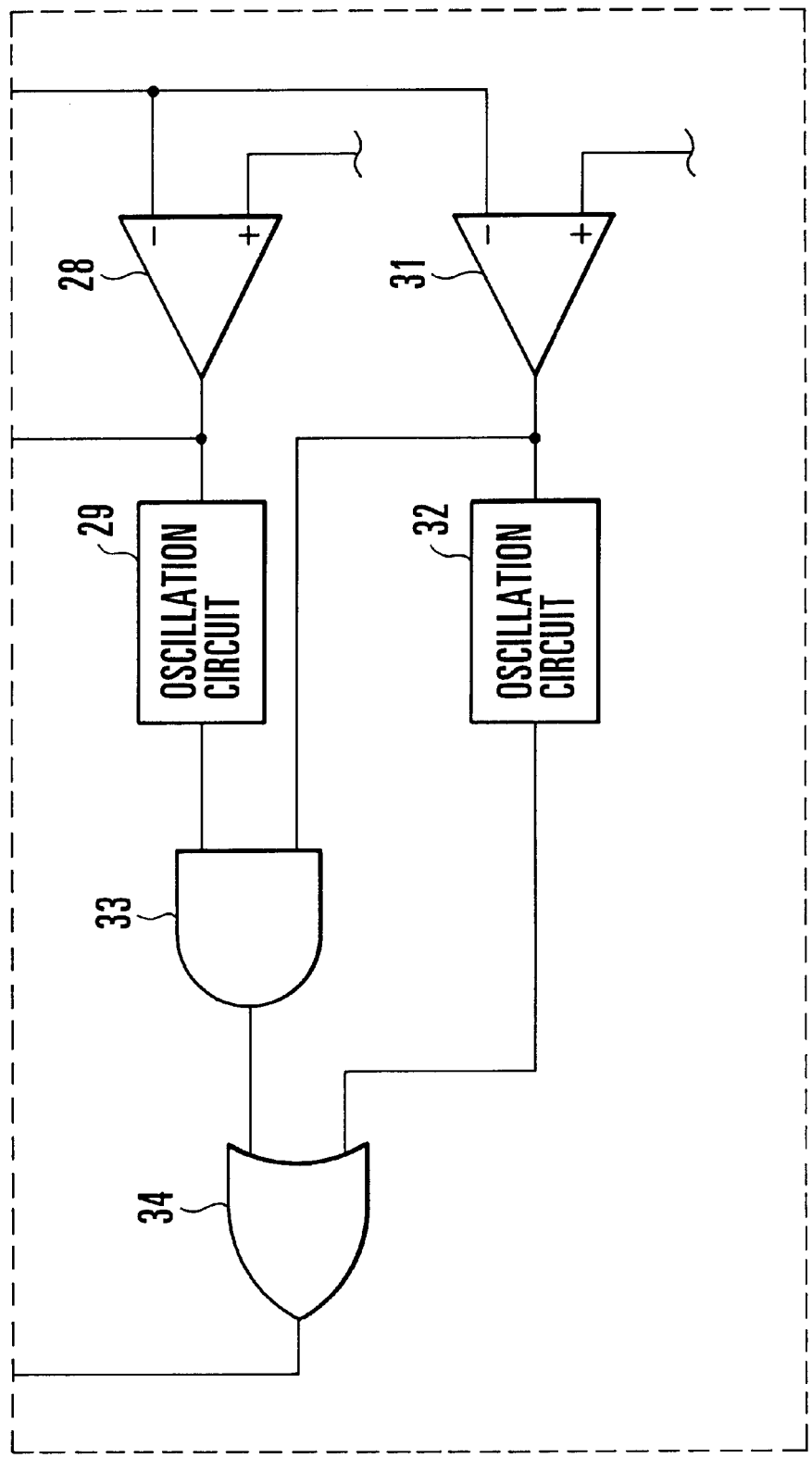
FIG. 3 is a circuit diagram showing the arrangement of a second embodiment of the invention.

A second embodiment of the invention is shown in FIG. 3. FIG. 3 shows another example of circuit arrangement of a part of FIG. 1 encompassed with a broken line. In the case of the first embodiment, although the main capacitor 9 is charged during the period between the points of time t1 and t2, if the charging process progresses to give a full charged state within this period, the charging process might come to an end before arrival at the point of time t2. In that event, the supply of power would unnecessarily continue after the end of charging and before the point of time t2, thereby causing a loss of power. The arrangement of the second embodiment shown in FIG. 3 is intended to prevent such a loss.

Referring to FIG. 3, a comparator 28 functions in the same manner as the comparator 28 shown in FIG. 1. The comparator 28 has its minus input terminal, its plus input terminal and its output terminal connected in the same manner as in the case of the first embodiment shown in FIG. 1. An oscillation circuit 29 also functions in the same manner as the oscillation circuit 29 shown in FIG. 1. A comparator 31 has its minus input terminal connected to a junction point between the resistances 26 and 27, its output terminal connected to the input of an oscillation circuit 32 and its plus input terminal connected to a second reference voltage source.

The oscillation circuit 32 is arranged to be inhibited from oscillating and thus to output a low-level signal therefrom when a high-level signal is inputted. When a low-level signal is inputted, the oscillation circuit 32 begins to oscillate. During oscillation, the oscillation circuit 32 outputs a high-level signal for a period shorter than the period Ton3 between the points of time t1 and t2 shown in FIG. 2 and outputs a low-level signal for a period which is equal to or longer than the period Toff1 between the points of time t2 and t3 shown in FIG. 2. An AND circuit 33 has its one input terminal connected to the output of the oscillation circuit 29 and the other input terminal connected to the output of the comparator 31. An OR circuit 34 has its input terminal connected to the output of the AND circuit 33, the other input terminal connected to the oscillation circuit 32 and its output terminal connected to the gate of the FET 21.

Operation of the circuit arrangement of the second embodiment shown in FIG. 3 is next described with reference also to FIG. 1 as follows. When the power supply switch 2 is turned on, electric power is supplied to the comparators 28 and 31, the oscillation circuits 29 and 32, the AND circuit 33 and the OR circuit 34. When the voltage of the main capacitor 9 is low, the output of each of the comparators 28 and 31 is at a high level. Thus, the oscillation circuits 29 and 32 are inoperative and the FET 24 is in its on-state. This state is the same as the state obtained in the first embodiment, i.e., within the circuit encompassed with a broken line in FIG. 1, when the voltage of the main capacitor 9 is low.

When the output of the comparator 28 becomes a low level with the main capacitor 9 charged, the FET 24 is turned off and the oscillation circuit 29 begins to operate. The voltage output of the oscillation circuit 29 then causes the FET 21 to turn on and off according thereto through the AND circuit 33 and the OR circuit 34. This state is the same as the state of the first embodiment obtained within the circuit encompassed with the broken line in FIG. 1 when the voltage of the main capacitor 9 is high.

Further, the other oscillation circuit 32 begins to operate when the level of the output of the comparator 31 becomes low with the voltage of the main capacitor 9 having increased. In this instance, the low-level output of the comparator 31 is transmitted to the input of the AND circuit 33, and, therefore, the output of the oscillation circuit 29 is not transmitted to the OR circuit 34. The output of the oscillation circuit 32 is thus transmitted via the OR circuit 34 to the gate of the FET 21. Then, since, as mentioned above, the transistor 5 is caused by the output of the oscillation circuit 32 to be in its on-state just for a period shorter than the period Ton3 between the points of time t1 and t2 shown in FIG. 2, a loss of current can be prevented as mentioned above. The voltage of the main capacitor 9 at the time when the output of the comparator 31 shifts to a low level is set at 300 V or thereabout. Although two comparators are provided in the case of FIG. 3, the arrangement may be changed to provide three or more comparators to more finely carry out control.

Figure 4:
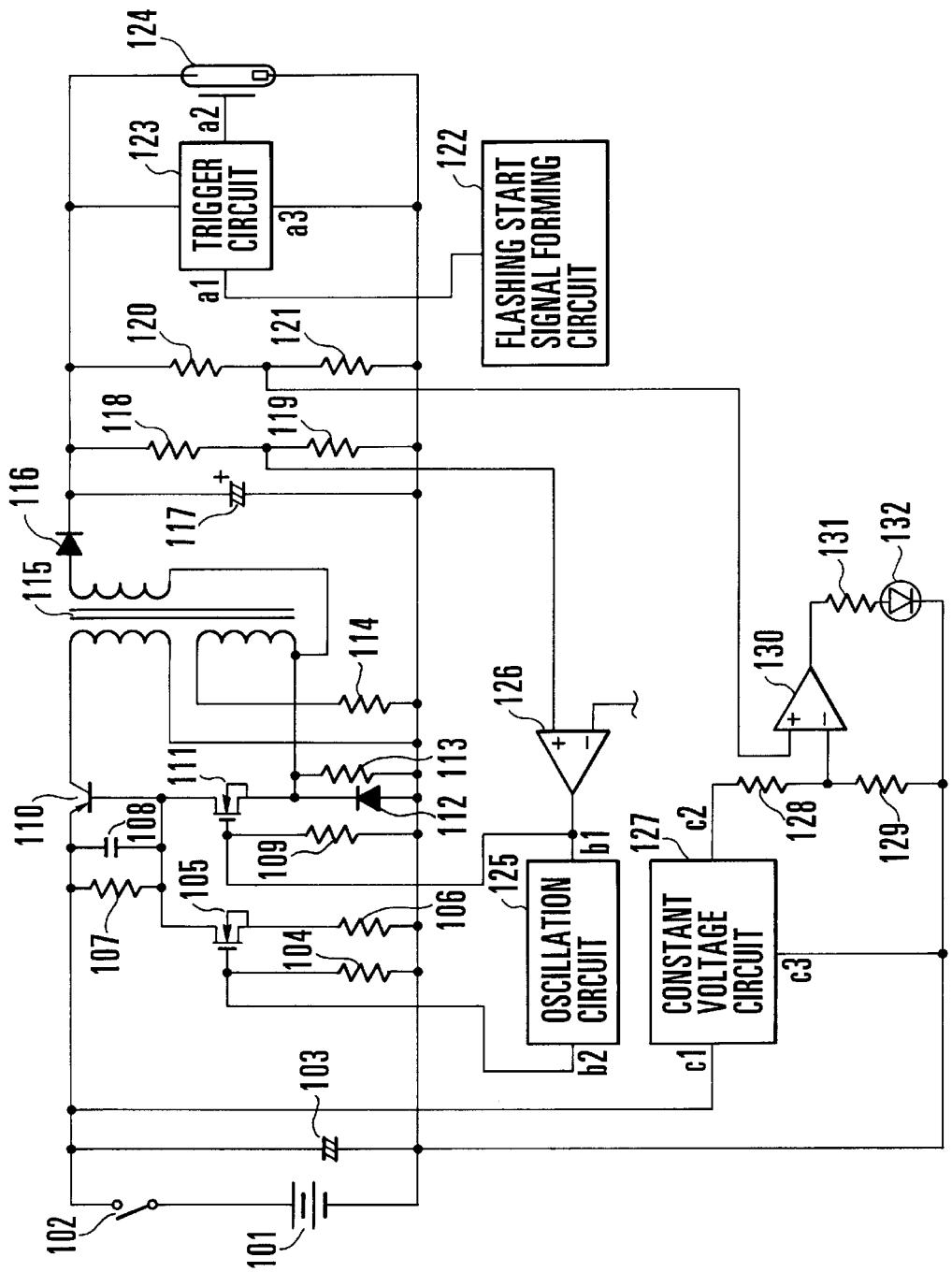
FIG. 4 is a circuit diagram showing the arrangement of a third embodiment of the invention.

FIG. 4 shows a third embodiment of the invention. FIG. 4 is a circuit diagram of an electronic flash device provided with a power supply device having an oscillation circuit in which a load varies.

In FIG. 4, reference numeral 101 denotes a power supply battery. A switch 102 has its one end connected to the plus terminal of the power supply battery 101 and the other end connected to the emitter of a transistor 110. A capacitor 103 is connected in parallel to the power supply battery 101. A resistance 104 has its one end connected to the gate of an FET 105 and the other end connected to the minus terminal of the power supply battery 101. The FET 105 has its gate connected to one end of the resistance 104, its source connected to one end of a resistance 106 and its drain connected to the base of the transistor 110.

The resistance 106 has its one end connected to the source of the FET 105 and the other end connected to the minus terminal of the power supply battery 101. A resistance 107 has its one end connected to the base of the transistor 110 and the other end connected to the emitter of the transistor 110. A capacitor 108 is connected in parallel to the resistance 107.

A resistance 109 has its one end connected to the gate of an FET 111 and the other end connected to the minus terminal of the power supply battery 101. The transistor 110 is an PNP transistor, which has its base connected to the drain of the FET 105, its emitter connected to the plus terminal of the power supply battery 101 and its collector connected to one end of the primary winding of an oscillation transformer 115.

The FET 111 has its gate connected to one end of the resistance 109, its source connected to one end of the feedback winding of the oscillation transformer 115 and its drain connected to the base of the transistor 110.

A diode 112 has its anode connected to the minus terminal of the power supply battery 101 and its cathode connected to the source of the FET 111. A resistance 113 is connected in parallel to the diode 112. A resistance 114 is connected to the other end of the feedback winding of the oscillation transformer 115.

The primary winding of the oscillation transformer 115 has its one end connected to the collector of the transistor 110 and the other end connected to the minus terminal of the power supply battery 101, and the feedback winding of the oscillation transformer 115 has its one end connected to the source of the FET 111 and the other end connected to one end of the resistance 114.

Further, the secondary winding of the oscillation transformer 115 has its one end connected to the source of the FET 111 and the other end connected to the anode of a diode 116. The diode 116 has its anode connected to one end of the secondary winding of the oscillation transformer 115 and its cathode connected to the anode of a capacitor 117.

The capacitor 117 is arranged to store energy for emission of flash light (flashing). The capacitor 117 has its anode connected to the cathode of the diode 116 and its cathode connected to the minus terminal of the power supply battery 101.

Resistances 118 and 119 are connected in series to each other to form a series circuit, which is connected in parallel to the capacitor 117. Resistances 120 and 121 are connected in series to each other to form a series circuit, which is connected in parallel also to the capacitor 117.

A flashing start signal forming circuit 122 is arranged to form a flashing start signal and to send the flashing start signal to a trigger circuit 123. The trigger circuit 123 is arranged to receive the output of the flashing start signal forming circuit 122 at its input terminal a1 and to send a high-frequency high voltage from its output a2 to the trigger electrode of a flash discharge tube 124. The flash discharge tube 124 is arranged to emit flash light by discharging the electric charge of the capacitor 117. The flash discharge tube 124 has its anode connected to the anode of the capacitor 117 and its cathode connected to the cathode of the capacitor 117.

An oscillation circuit 125 for separately-excited oscillation is arranged to output a repeat signal of a predetermined duty ratio from its output terminal b2 when performing oscillation. The oscillation circuit 125 is inhibited from oscillating when its input terminal b1 is at a high level and is allowed to oscillate when the input terminal b1 is at a low level.

A comparator 126 is arranged to be supplied with power from a constant voltage circuit 127. The comparator 126 has its minus input terminal connected to a reference voltage generating circuit (not shown) supplied with power from the constant voltage circuit 127, its plus input terminal connected to a junction point between the resistances 118 and 119, and its output terminal connected to the input terminal b1 of the oscillation circuit 125 and the gate of the FET 111.

The resistances 118 and 119, the comparator 126 and the reference voltage generating circuit (not shown) constitute a first capacitor voltage detecting circuit.

The constant voltage circuit 127 has its input terminal c1 connected to the anode of the capacitor 103 and its output terminal c2 connected to one end of a resistance 128. The resistance 128 has its one end connected to the output terminal c2 of the constant voltage circuit 127 and the other end connected to the minus input of a comparator 130. A resistance 129 has its one end connected to the minus input of the comparator 130 and the other end connected to the minus terminal of the power supply battery 101.

The comparator 130 has its minus input terminal connected to a junction point between the resistances 128 and 129, its plus input terminal connected to a junction point between the resistances 120 and 121, and its output terminal connected to a resistance 131. The resistances 120, 121, 128 and 129 and the comparator 130 constitute a second capacitor voltage detecting circuit.

The resistance 131 has its one end connected to the output of the comparator 130 and the other end connected to the cathode of an LED (light emitting diode) 132, which is arranged to indicate a state of charge of the capacitor 117. The LED 132 has its anode connected to one end of the resistance 131 and its cathode connected to the minus terminal of the power supply battery 101.

Operation of the electronic flash device shown in FIG. 4 according to the third embodiment of the invention is next described as follows.

Assuming that no electric charge is stored in the capacitor 117, when the switch 102 is closed under this condition, the constant voltage circuit 127 acts to supply electric power to the reference voltage generating circuit (not shown) as well as to the comparator 130, the oscillation circuit 125 and the comparator 126.

As a result, a reference voltage is supplied to the minus input terminal of the comparator 126. Further, since the capacitor 117 has not yet been charged, the plus input terminal of the comparator 126 is at a "0" potential. The level of the output of the comparator 126 is, therefore, low.

With the output of the comparator 126 at a low level, the FET 111 is in an off-state. The oscillation circuit 125 then outputs an oscillation waveform in a certain fixed duty ratio between a high level and a low level.

When the level of the output of the oscillation circuit 125 becomes high, the FET 105 is turned on. Then, the base current of the transistor 110 flows through the resistance 106, so that the transistor 110 is turned on. Accordingly, the collector current of the transistor 110 flows to the primary winding of the oscillation transformer 115. As a result, therefore, the capacitor 117 is charged through the diode 116 connected to the secondary winding of the transformer 115. Then, the collector current of the transistor 110 increases to cause a drop in the voltage of the battery. However, the output of the oscillation circuit 125 shifts to a low level before the battery voltage drops to a voltage which renders the constant voltage circuit 127 operative.

A period of time for which the oscillation output of the oscillation circuit 125 remains at its high level is set beforehand. While the oscillation output is at its low level, the FET 105 is in an off-state to allow no flow of the collector current of the transistor 110, so that the battery voltage can be allowed to recover. A period of time for which the oscillation output remains at its low level is also set beforehand.

Next, when the level of the oscillation output of the oscillation circuit 125 becomes high again, the FET 105 is turned on again. The transistor 110 is also turned on to charge the capacitor 117. Then, after the lapse of a predetermined period of time, the level of the oscillation output of the oscillation circuit 125 becomes low to cause the transistor 110 to be turned off. This action is repeated thereafter. In other words, the action of separately-excited oscillation type is performed.

With the above-stated action repeated, the capacitor 117 is gradually charged. Therefore, a voltage at the junction point between the resistances 118 and 119 also rises. When the voltage at the junction point between the resistances 118 and 119 comes to exceed the reference voltage supplied to the minus input terminal of the comparator 126, the level of the output of the comparator 126 changes from a low level to a high level. The high-level output of the comparator 126 then inhibits the oscillation circuit 125 from oscillating, so that the FET 105 is turned off.

Further, the high-level output of the comparator 126 causes the FET 111 to be turned on. The turning-on of the FET 111 causes a self-excited oscillation circuit which is formed in a known manner jointly by the transistor 110, the FET 111, the oscillation transformer 115, the resistances 107, 113 and 114, the capacitor 108 and the diode 112 to begin to act. Since the capacitor 117 has already been charged up to a predetermined value, the current obtained when the transistor 110 is turned on at the start of the action of the self-excited oscillation circuit is not large. The voltage of the power supply battery 101, therefore, never drops below a voltage level at which the constant voltage circuit 127 operates.

Further, with a charging action on the capacitor 117 in the self-excited oscillation progressed, when the voltage at the junction point between the resistances 120 and 121 comes to exceed the voltage of the minus input terminal of the comparator 130, the output level of the comparator 130 becomes high to cause the LED 132 to light up. The level of voltage of the capacitor 117 at which the LED 132 lights up is set at a voltage which is sufficiently high to cause the flash discharge tube 124 to emit flash light.

After that, the trigger circuit 123 is caused to act by the flashing start signal of the flashing start signal forming circuit 122, so that the flash discharge tube 124 emits flash light. After flashing by the flash discharge tube 124, the voltage of the capacitor 117 drops again. Then, in the same manner as described above, a voltage boosting action is performed in the separately-excited oscillation when the voltage of the capacitor 117 is at a low level, and in the self-excited oscillation when the voltage of the capacitor 117 exceeds the predetermined value. Therefore, when the voltage of the capacitor 117 is low (i.e., when the load is large), the oscillation circuit operates in the separately-excited oscillation, so that the frequency of oscillation is maintained constant, thereby causing no uncomfortable oscillation sound.

I claim:

1. An electronic flash device in which a voltage of a power supply battery is boosted to be supplied to a load, said electronic flash device comprising:
   a) a first oscillation circuit for self-excited type;
   b) a second oscillation circuit for separately-excited type; and
   c) a changeover circuit for performing a changeover between said first oscillation circuit and said second oscillation circuit in accordance with a condition of said load.

2. An electronic flash device according to claim 1, wherein said changeover circuit detects a voltage of said load, compares the detected voltage with a predetermined value to obtain a comparison result, and performs a changeover between said first oscillation circuit and said second oscillation circuit, on the basis of the comparison result.

3. An electronic flash device according to claim 2, wherein said load is a capacitor which supplies light-emitting energy to a flash discharge lamp, and the voltage of said load is a voltage of said capacitor.

4. An electronic flash device in which a voltage of a power supply battery is boosted to be supplied to a load, said electronic flash device comprising:
   a) a first oscillation circuit for self-excited type;
   b) a second oscillation circuit for separately-excited type; and
   c) a changeover circuit for performing a changeover such that, when said electronic flash device is started, said first oscillation circuit is caused to operate and, after that, said second oscillation circuit is caused to operate.

5. An electronic flash device according to claim 4, wherein said changeover circuit detects a condition of said load and performs a changeover such that said first oscillation circuit is caused to operate when the condition of said load is a condition of higher load than a predetermined condition, and said second oscillation circuit is caused to operate when the condition of said load is a condition of lower load then the predetermined condition.

6. an electronic flash device according to claim 4, wherein said changeover circuit detects a voltage of said load and performs a changeover such that said first oscillation circuit is caused to operate when the detected voltage is lower than a predetermined value, and said second oscillation circuit is caused to operate when the detected voltage is higher than the predetermined value.

7. An electronic flash device according to claim 6, wherein said load is a capacitor which supplies light-emitting energy to a flash discharge lamp, and the voltage of said load is a voltage of said capacitor.

8. An electronic flash device in which a voltage of a power supply battery is boosted to be supplied to a load, said electronic flash device comprising:
   a) a first oscillation circuit for self-excited type;
   b) a second oscillation circuit for separately-excited type; and
   c) a changeover circuit for performing a changeover such that, when said electronic flash device is started, said second oscillation circuit is caused to operate and, after that, said first oscillation circuit is caused to operate.

9. An electronic flash device according to claim 8, wherein said changeover circuit detects a condition of said load and performs a changeover such that said first oscillation circuit is caused to operate when the condition of said load is a condition of lower load than a predetermined condition, and said second oscillation circuit is caused to operate when the condition of said load is a condition of higher load than the predetermined condition.

10. An electronic flash device according to claim 8, wherein said changeover circuit detects a voltage of said load and performs a changeover such that said first oscillation circuit is caused to operate when the detected voltage is higher than a predetermined value, and said second oscillation circuit is caused to operate when the detected voltage is lower than the predetermined value.

11. An electronic flash device according to claim 10, wherein said load is a capacitor which supplies light-emitting energy to a flash discharge lamp, and the voltage of said load is a voltage of said capacitor.

12. An electronic flash device in which a voltage of a power supply battery is boosted to be supplied to a load, said electronic flash device comprising:
   a) a transformer having at least a primary winding and a secondary winding;
   b) an oscillating transistor which causes an oscillating action to be performed by causing a current to flow to the primary winding of said transformer;
   c) a first switching circuit which causes a self-excited oscillating action to be performed by transmitting a voltage from said transformer to a control electrode of said oscillating transistor;
   d) a second switching circuit which causes a separately-excited oscillating action to be performed by transmitting a clock signal to the control electrode of said oscillating transistor; and
   e) a selection circuit which selects and causes one of said first switching circuit and said second switching circuit to operate.

13. An electronic flash device according to claim 12, wherein said selection circuit detects a voltage of said load and performs a changeover such that said first switching circuit is caused to operate when the detected voltage is lower than a predetermined value, and said second switching circuit is caused to operate when the detected voltage is higher than the predetermined value.

14. An electronic flash device according to claim 13, wherein said load is a capacitor which supplies light-emitting energy to a flash discharge lamp, and the voltage of said load is a voltage of said capacitor.

15. An electronic flash device according to claim 12, wherein said selection circuit detects a voltage of said load and performs a changeover such that said first switching circuit is caused to operate when the detected voltage is higher than a predetermined value, and said second switching circuit is caused to operate when the detected voltage is lower than the predetermined value.

16. An electronic flash device according to claim 15, wherein said load is a capacitor which supplies light-emitting energy to a flash discharge lamp, and the voltage of said load is a voltage of said capacitor.

17. A power supply circuit in which a voltage of a power supply battery is boosted to be supplied to a load, said power supply circuit comprising:
   a) a first oscillation circuit for self-excited type;

b) a second oscillation circuit for separately-excited type; and c) a changeover circuit for performing a changeover between said first oscillation circuit and said second oscillation circuit in accordance with a condition of said load.

18. A power supply circuit according to claim 17, wherein said changeover circuit detects a voltage of said load, compares the detected voltage with a predetermined value to obtain a comparison result, and performs a changeover between said first oscillation circuit and said second oscillation circuit, on the basis of the comparison result.

19. a power supply circuit in which a voltage of a power supply battery is boosted to be supplied to a load, said power supply circuit comprising:

a) a first oscillation circuit for self-excited type;

b) a second oscillation circuit for separately-excited type; and c) a changeover circuit for performing a changeover such that, when said power supply circuit is started, said first oscillation circuit is caused to operate and, after that, said second oscillation circuit is caused to operate.

20. A power supply circuit according to claim 19, wherein said changeover circuit detects a condition of said load and performs a changeover such that said first oscillation circuit is caused to operate when the condition of said load is a condition of higher load than a predetermined condition, and said second oscillation circuit is caused to operate when the condition of said load is a condition of lower load then the predetermined condition.

21. A power supply circuit according to claim 19, wherein said changeover circuit detects a voltage of said load and performs a changeover such that said first oscillation circuit is caused to operate when the detected voltage is lower than a predetermined value, and said second oscillation circuit is caused to operate when the detected voltage is higher than the predetermined value.

22. A power supply circuit in which a voltage of a power supply battery is boosted to be supplied to a load, said power supply circuit comprising:

a) a first oscillation circuit for self-excited type;

b) a second oscillation circuit for separately-excited type; and c) a changeover circuit for performing a changeover such that, when said power supply circuit is started, said second oscillation circuit is caused to operate and, after that, said first oscillation circuit is caused to operate.

23. A power supply circuit according to claim 22, wherein said changeover circuit detects a condition of said load and performs a changeover such that said first oscillation circuit is caused to operate when the condition of said load is a condition of lower load than a predetermined condition, and said second oscillation circuit is caused to operate when the condition of said load is a condition of higher load than the predetermined condition.

24. A power supply circuit according to claim 22, wherein said changeover circuit detects a voltage of said load and performs a changeover such that said first oscillation circuit is caused to operate when the detected voltage is higher than a predetermined value, and said second oscillation circuit is caused to operate when the detected voltage is lower than the predetermined value.

25. A power supply circuit in which a voltage of a power supply battery is boosted to be supplied to a load, said power supply circuit comprising:

a) a transformer having at least a primary winding and a secondary winding;

b) an oscillating transistor which causes an oscillating action to be performed by causing a current to flow to the primary winding of said transformer;

c) a first switching circuit which causes a self-excited oscillating action to be performed by transmitting a voltage from said transformer to a control electrode of said oscillating transistor;

d) a second switching circuit which causes a separately-excited oscillating action to be performed by transmitting a clock signal to the control electrode of said oscillating transistor; and e) a selection circuit which selects and causes one of said first switching circuit and said second switching circuit to operate.

26. A power supply circuit according to claim 25, wherein said selection circuit detects a voltage of said load and performs a changeover such that said first switching circuit is caused to operate when the detected voltage is lower than a predetermined value, and said second switching circuit is caused to operate when the detected voltage is higher than the predetermined value.

27. A power supply circuit according to claim 25, wherein said selection circuit detects a voltage of said load and performs a changeover such that said first switching circuit is caused to operate when the detected voltage is higher than a predetermined value, and said second switching circuit is caused to operate when the detected voltage is lower than the predetermined value.

* * * * *